April 20, 1943.    M. LOPEZ-HENRIQUEZ    2,317,282
MOVING PICTURE FILM AND PROJECTING APPARATUS
Filed May 28, 1940    2 Sheets-Sheet 1

WITNESSES

INVENTOR
Miguel Lopez-Henriquez
BY
ATTORNEYS

April 20, 1943.   M. LOPEZ-HENRIQUEZ   2,317,282
MOVING PICTURE FILM AND PROJECTING APPARATUS
Filed May 28, 1940   2 Sheets-Sheet 2
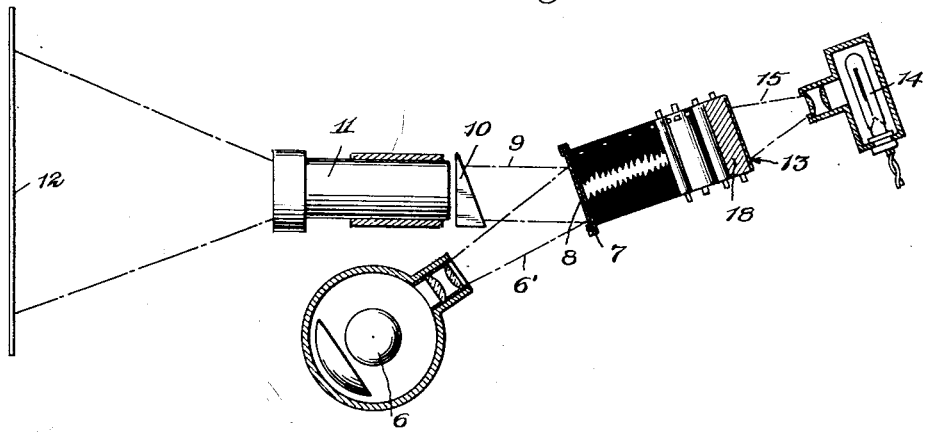
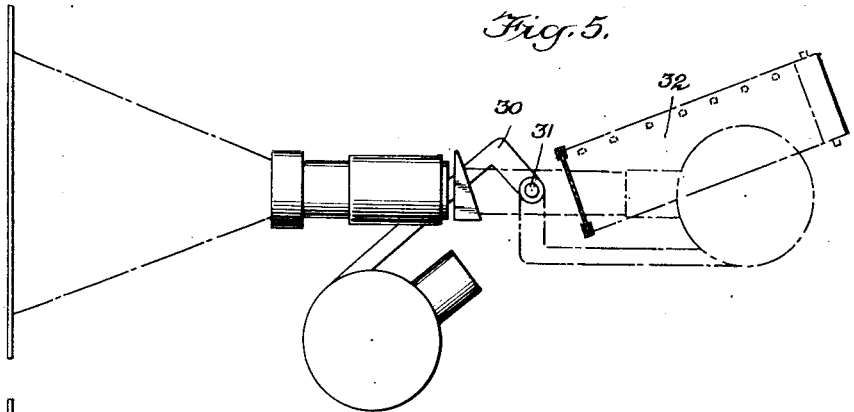
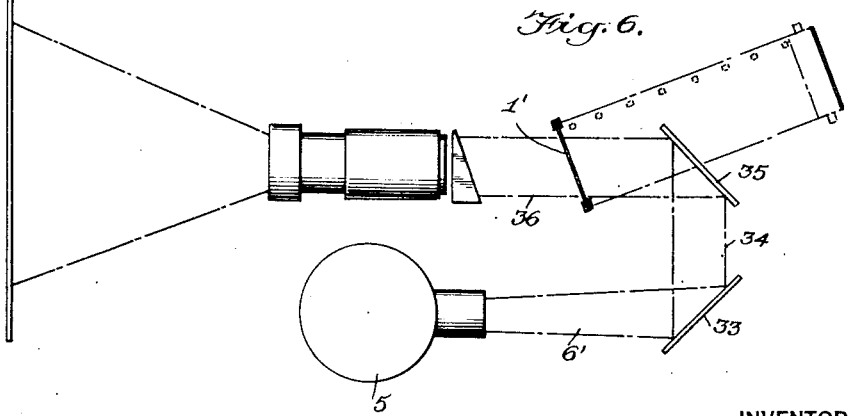
INVENTOR
Miguel Lopez-Henriquez
BY
ATTORNEYS Patented Apr. 20, 1943

2,317,282

UNITED STATES PATENT OFFICE 2,317,282

MOVING PICTURE FILM AND PROJECTING APPARATUS

Miguel Lopez-Henriquez, New York, N. Y.

Application May 28, 1940, Serial No. 337,622

2 Claims. (Cl. 88—17)

This invention relates to an improved moving picture film and an improved projecting apparatus coacting with the film whereby pictures may be projected from the film and also sound taken therefrom.

Another object of the invention is to provide a film having a metal support provided with reflecting surfaces on both sides with means on one side presenting a sound track and means on the other side presenting a picture track.

An additional object is to provide a projecting apparatus which may be used for a transparent film or an opaque film.

In the accompanying drawings—

Fig. 4 is a horizontal sectional view through Fig. 3 illustrating the relative position of the source of light and certain of the parts;

Fig. 5 is a view similar to Fig. 4 but illustrating a modified construction wherein the device is adapted to project pictures from a transparent film;

Fig. 6 is a view similar to Fig. 4 but illustrating a transparent film being projected.

Figure 1:
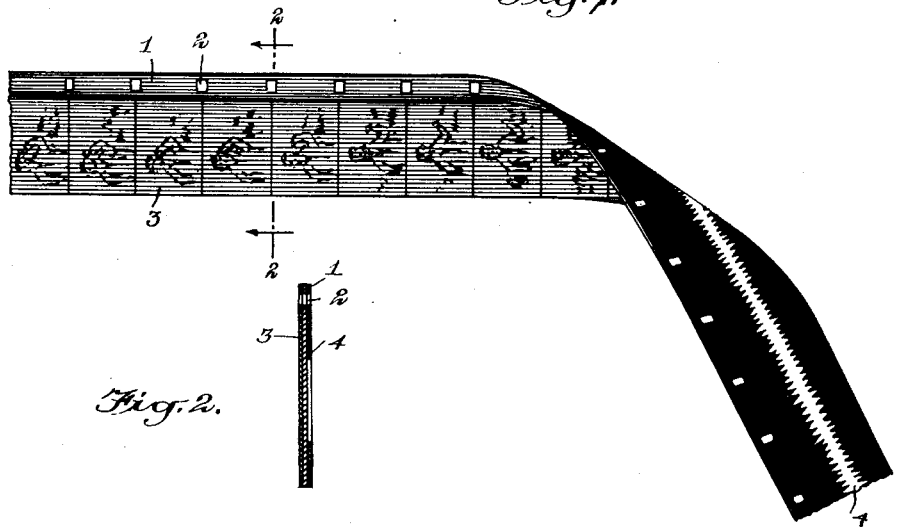
Fig. 1 is a view in elevation illustrating a short section of film disclosing an embodiment of the invention.
Figure 2:
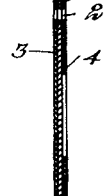
Fig. 2 is an enlarged sectional view through Fig. 1 approximately on the line 2—2.

Referring to the accompanying drawings by numerals, 1 indicates a metal foundation or support which is thin flexible metal. The metal used may be thin flexible steel polished on both surfaces or it may be any desired alloy or metal chromium plated or otherwise treated to make the same reflecting. The device or support 1 is also provided with a row of apertures 2 to receive teeth of an actuating sprocket wheel. On one surface of the support 1 is arranged a picture track 3 and on the other surface a sound track 4. The picture track 3 includes the usual emulsion for carrying the picture, as illustrated particularly in Fig. 1. The sound track 4 may be made photographically or may be printed or applied in any desired manner, while the base 1 may be of any opaque flexible material which is preferably metal and, therefore, properly supports the tracks 3 and 4.

Figure 3:
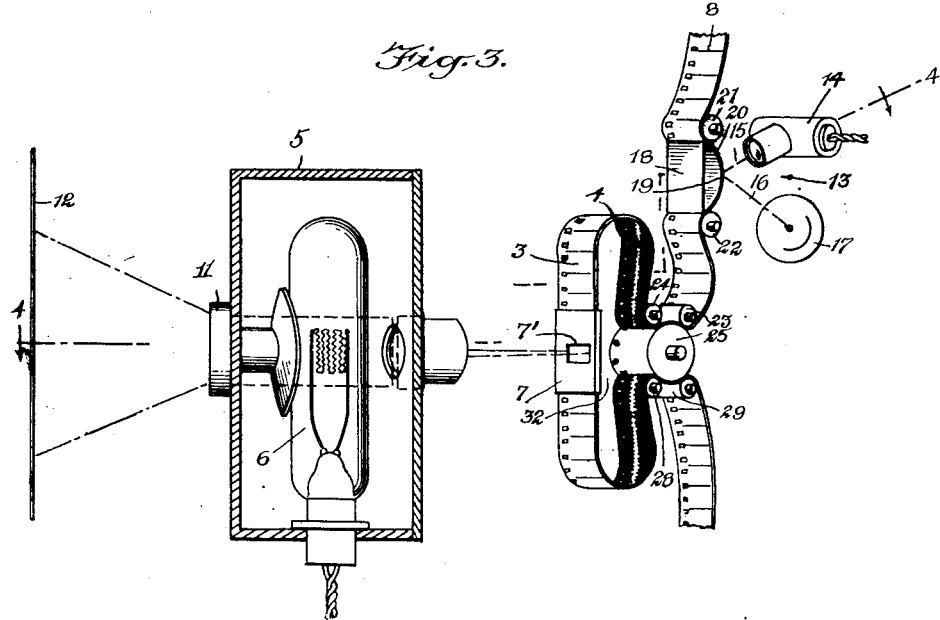
Fig. 3 is a view partly in elevation and partly in section, the section being taken on the line 3—3 of Fig. 4 with the parts illustrating a projector and an opaque film associated therewith.

While the film may be of any desired width, it is preferably a narrow film, as for instance 8 mm. By reason of this fact, it would be difficult to get a desired size picture and a sound track on the same surface. This problem has been solved by making the support 1 opaque and providing a picture track on one surface and a sound track on the opposite surface. Therefore, a special projector 5, as shown in Figs. 3 and 4, must be used. This projector includes a source of light 6 and a guide 7 for guiding the film 8 at an angle to the source of light. A beam of light 6' from the source 6 strikes the film and produces a reflected beam 9 which passes through the prism 10 so that the rays will be rectified or straightened properly and then pass through a focusing device 11, which may be of any standard kind. By reason of this construction the pictures on the film 8 are reproduced and greatly enlarged on a screen 12.

The projecting apparatus may be used alone as just described, or may be used in connection with a sound reproducing structure 13 as shown particularly in Fig. 3. This structure includes a source of light 14 which provides a beam of light 15 adapted to strike the sound track 4 and provide a reflected beam of light 16, which strikes a photoelectric cell 17 and affects the same in the usual manner. The photoelectric cell 17 is connected in any well-known manner to an amplifier and the amplifier, in turn, is connected in any desired well-known way to a loud speaker which may be positioned near the screen 12 or at any other place desired. In order to secure the best results, a guide 18 is provided having an arc-shaped surface 19 over which the film passes. As shown in the accompanying drawings, the surface 19 is part of a rather small circle but in actual use the curvature of the surface 19 is very small and is only sufficient to keep the portion 20 of the film against wabbling and smooth while the beam of light 15 plays thereon.

Suitable guiding rollers 21 and 22 hold the section 20 of the film so that it will continually contact with the surface 19, while allowing easy passage of the film. The film moving from roller 22 passes beneath the guiding rollers 23 and 24 and over a sprocket roller 25 which pulls the film and feeds the same to the guide 7 and through the guide to a discharge point with the film held in contact with sprocket roller 25 by the guide rollers 28 and 29. Any suitable mechanism may be used to cause the film to pass through the guide 7 and also to be properly framed in the opening 7'.

It will be evident that either the projector 5 or the sound reproducer 13 may be used independently or in connection with each other. Preferably the parts are so arranged that the sound is reproduced at the same time that the pictures are projected on the screen 12. Where a transparent silent film is used, the light source 5 is swung around to the position shown in Fig. 5. In order to secure this result, the light source 5 is mounted on a swinging bracket 30 pivotally mounted at 31. When it is desired to adapt the projector to project pictures from an opaque film and also a transparent film, it will be necessary to form the parts as shown in Fig. 5 so that the open space 32 will be sufficiently large to receive the source of light 5.

In Fig. 5 a modified construction is presented wherein the entire source of light 5 is swung around to project a beam of light through a transparent sound film. In Fig. 6 a modified form of this idea is disclosed wherein the source of light 5 is merely rotated in situ so that the beam of light 6' will strike a reflector 33 and project a reflected beam of light 34 against the reflector 35 which, in turn, projects a beam of light 36. This structure is to be used when the film 1' is transparent.

I claim:

1. A projecting apparatus for projecting pictures on a screen from a substantially transparent film and from an opaque film including a unitary source of light, swingable means for supporting said source of light so that it will project a beam of light on to said film at an angle therto when projecting pictures from an opaque film or supporting said source of light so that it will project a beam of light through said film when the film is substantially transparent and means for focusing the light emanating from either of said films on said screen.

2. Projecting apparatus for projecting pictures on a screen from either transparent or opaque film comprising focussing means, means for supporting a film in back of the focussing means so that light rays reflected or projected from the film may pass through the focussing means, a light source having means for projecting a beam of light therefrom, and means consisting of a swingable bracket for supporting the light source so that it may be shifted from a position directing the beam of light against the surface of the film which faces towards the focussing means to a point directing the beam of light against the surface of the film facing away from the focussing means.

MIGUEL LOPEZ-HENRIQUEZ.